SWITCHING CIRCUIT EMPLOYING TRANSISTOR UTILIZING
MINORITY-CARRIER STORAGE EFFECT TO MAINTAIN
TRANSISTOR CONDUCTING BETWEEN INPUT PULSES
Original Filed Nov. 15, 1957
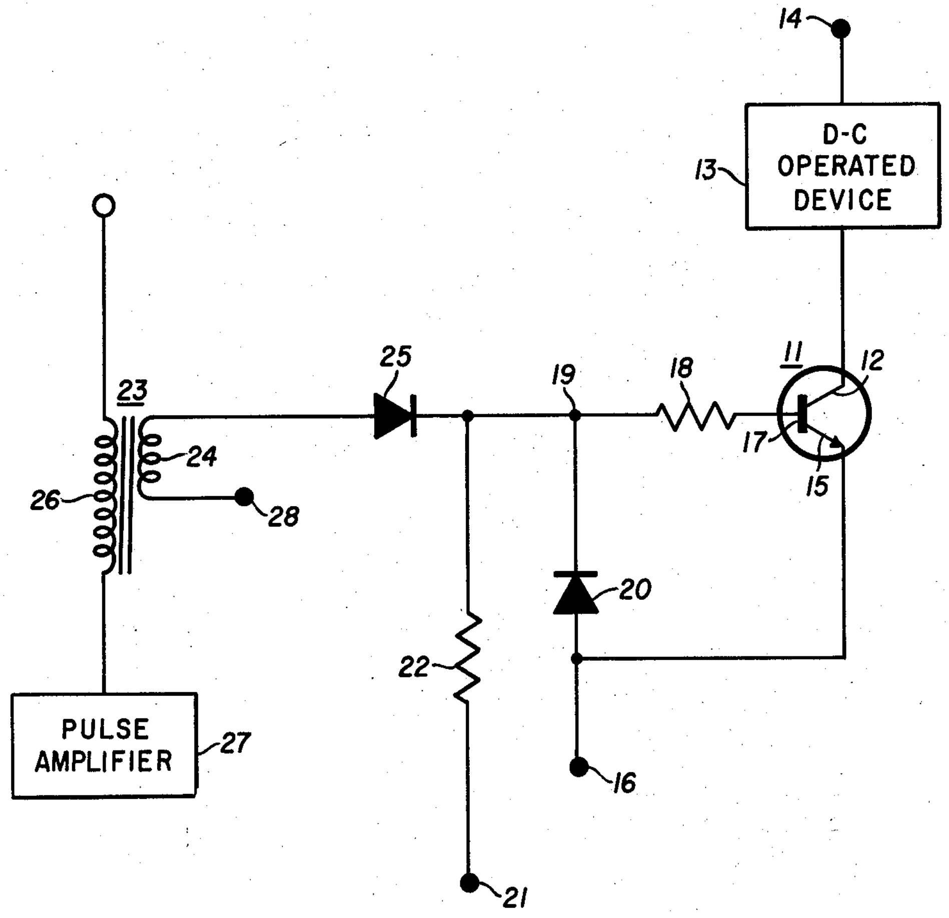
INVENTORS
EDMUND U. COHLER
JOSEPH E. MONAHAN
BY F. L. Sullivan
ATTORNEY 3,144,563

SWITCHING CIRCUIT EMPLOYING TRANSISTOR UTILIZING MINORITY-CARRIER STORAGE EFFECT TO MAINTAIN TRANSISTOR CONDUCTING BETWEEN INPUT PULSES

Edmund U. Cohler, Brookline, and Joseph E. Monahan, Framingham, Mass., assignors to Sylvania Electric Products Inc., a corporation of Delaware Continuation of application Ser. No. 696,788, Nov. 15, 1957. This application Apr. 14, 1960, Ser. No. 23,124
6 Claims. (Cl. 307—88.5)

This invention is concerned with electronic switching circuits, and particularly with pulse-to-gate converters useful in electronic computers. The present application is a continuation of U.S. patent application Ser. No. 696,788, filed November 15, 1957, now abandoned.

Many computers, e.g., SEAC, DYSEAC, and UDOFT, employ dynamic circuit techniques in their logical realization, instead of the more conventional bi-stable devices. In such circuitry, intelligence is conveyed by pulses occurring at fixed time intervals, with the presence of pulses at a given interval indicating a "1" or a yes and the absence of pulses, a "0" or no. The pulses are driven from an amplifier which provides logical operation upon and regeneration of an input pulse. It is often desirable to have an external device driven from one of these pulse amplifiers, and usually such devices have direct current requirements as distinguished from the pulse train output of the amplifier. In such instances, the computer is so programmed that the pulse amplifier from which the output is derived emits a string of pulses for the time during which the output is desired. Some method is then required for converting these pulse trains into an acceptable signal for the output device. In a typical instance, the UDOFT computer is required to illuminate lights on panels, activate relays, and turn on certain audio effects.

In earlier designs for such pulse operation of direct current equipment, relays have been employed, because their low frequency response averages the output of the pulse amplifier tube, "pulling up" when the average output is high (a string of pulses is occurring) and dropping out when no pulses occur. This method, however, has disadvantages. From the viewpoint of economics and physical design, good relays are expensive and bulky. Moreover, their electrical characteristics present difficulties because of contact bounce and reactance in the relay coil; also, the relay must be placed in the primary of the pulse transformer to eliminate the loading effects of coil capacity and inductance. This presents a considerable problem when the pulse amplifier tubes are operated near their cut-off voltage, as in some computers, because, due to the variation in tube characteristics, certain tubes supply more average direct current in the "off" condition than others do in the "on" condition. As a result, the pull-up and drop-out characteristics of the relay must be individually adjusted for each operating tube and each replacement.

Accordingly, an object of the present invention is to provide a compact, economical, and reliable means for operating direct current devices in response to pulses of electric energy. Another, and related, object is to provide an improved, transistorized and pulse operated electronic switch.

These objectives are attained, in accordance with the invention, by utilizing the operating pulses to produce saturating current in a transistor connecting the device to be operated to a direct current source, and through taking advantage of the minority storage characteristics of the saturated transistor to sustain transistor current between pulses, thereby giving to a train of pulses a direct current switching capability. Other objects, features and advantages will be evident to those skilled in the art from the following description of a preferred embodiment of the invention and reference to the accompanying drawing, the single figure of which is a schematic diagram of a signal conversion and switching circuit, according to the invention.

In the system shown by way of example in the drawing, operating pulses derived from a pulse amplifier 27 are utilized to operate a direct current device 13 by applying them, through an input transformer 23, to a transistor 11 connected in series between the device to be operated and a source of direct current potential. The values of the circuit parameters are so selected that the transistor is normally biased to cut-off, and is driven to saturation by the operating pulses.

The transistor 11 has its collector 12 connected, through a direct current load 13 (the device to be operated), to a terminal 14 to which a source of positive reference potential may be applied. Its emitter 15 is connected, via terminal 16, to a source of negative reference potential, and its base 17, through resistor 18, to a junction point 19, which is in turn connected, via diode 20, to emitter 15. Another terminal 21 (to which a voltage more negative than that at terminal 16 is applied) is connected, through resistor 22 to the junction point 19.

The input to the circuit is derived from a transformer 23 having its secondary winding 24 connected through an isolating diode 25 to junction point 19 and its primary winding 26, to the pulse amplifier 27.

The device represented by load 13 may comprise direct current operated equipment such as an indicator light, an analog instrument, a solenoid or relay, etc., which is operated in response to, and for a time period coincident with, a train of pulses from the amplifier 27.

If the transistor 11 has satisfactory saturability and storage characteristics (e.g., those of the 2N35A), the pulse train coming through transformer 23 and applied to base 17 will cause the transistor 11 to act as a switch in the circuit between terminals 14 and 16 and the device 13 will be switched on and off in accordance with the presence or absence of a train of pules at the input to the circuit. A more detailed explanation of how this is accomplished follows.

With a positive 20 volts applied to terminal 14, a negative 3 volts applied to terminal 16, and a negative 20 volts applied to terminal 21, the transistor 11 is normally cut off; i.e., a minimum of current (less than 1 microampere) flows through the transistor and the load. Cut-off occurs because the base 17 is biased slightly negative with respect to the emitter 15 by positive current flow from the less negative potential at terminal 16, through diode 20 and resistor 22 to the more negative potential at terminal 21, with a slight voltage drop across the diode 20 providing the required bias. (With the voltage ratings given, a value of 560 ohms for resistor 22 will produce current adequate for this purpose.)

The secondary winding 24 of transformer 23 is normally biased by a negative 4.5 volts applied to terminal 28, and the signal input to the circuit from pulse amplifier 27 via transformer 23 comprises separate trains of .4 microsecond pulses at .8 microsecond intervals with an amplitude of approximately plus 3.5 volts. With this voltage input, resistor 18 is selected to have a value which will produce a base current sufficient to saturate the transistor. (2.7K ohms has proved satisfactory with the other values of circuit elements suggested.)

When the first pulse of a train is applied to base electrode 17 it drives it positive with respect to emitter 15, and causes saturation current to flow in the transistor. Saturation results in a concentration of excess minority carriers (holes or electrons) at the collector-emitter barrier; and at the end of the pulse, the excess carriers drift to the collector region, thus sustaining collector current. Successive pulses enhance this effect to render the transistor 11 continuously conductive. (For a discussion of transistor saturation and minority storage characteristics, see Principles of Transistor Circuits, R. F. Shea, Wylie and Sons, 1953, p. 394.)

In its saturated condition the trainsistor offers a very low impedance to the potential applied between terminals 14 and 16. Hence, substantially the full supply voltage and current capability of the transistor is available to operate the load device 13 as a train of positive pulses is delivered through input transformer 23. When the pulse train is discontinued device 13 is turned off because the transistor is biased to cut off by the voltage drop across diode 20.

The specific identities and values suggested for the elements of the illustrative circuit described merely reflect a workable combination, conventional substitutions may be made; and, with transistors currently available, supply potentials of forty volts or more are useable and load currents of 100 milliamperes are reliably achievable.

It is to be understood that the invention is not limited specifically to the embodiment illustrated and described, and is to be given the scope of the following claims.

What is claimed is:

1. An electronic circuit which comprises a saturable transistor having base, collector and emitter electrodes and minority carrier storage capability, means for applying a potential of one polarity through a direct current load to said collector, means for applying a potential of opposite polarity to said emitter, means for applying a biasing potential to said base, and means including a resistance for applying to said base a train of pulses of polarity, amplitude, current rating and repetition rate adequate to drive said transistor to saturation and maintain it in such saturated condition.

2. For operating a direct current device in response to control by pulsed voltage signals electronic signal converter which comprises: a transformer having primary and secondary windings; means for applying pulsed voltage signals to the primary of said transformer and a transistor with base, collector and emitter electrodes; said transistor having its base connected through a resistor, a unidirectional conducting device and the secondary winding of said transformer to a bias potential, its collector connected through a direct current load to a source of potential of a given polarity, and its emitter connected to a source of potential of opposite polarity and, through a unidirectional conducting device, to said base; and, a direct current device series connected in the collector-emitter circuit of said transistor.

3. In an electronic circuit having as an input a train of positive voltage pulses, means for applying direct current to a load in a manner responsive to and for a time duration substantially coincident with said pulse train which comprises: a saturable transistor having minority storage capabilities and collector, emitter and base electrodes; means for connecting said collector through said load to a point of reference potential of a given polarity; said minority storage capability of said transistor being so related to the frequency of the component pulses of said pulse train that it maintains the transistor in saturation between the recurring pulses of said trains; means for connecting said emitter to a point of reference potential of opposite polarity; impedance means by which said pulse train input may be applied to said base, said impedance means having a resistance characteristic adequate to cause pulses of said train to saturate said transistor; and, means for applying to said base a potential of proper polarity and sufficient amplitude with respect to said emitter to render said transistor substantially non-conductive when said positive pulses are not applied to said base.

4. In combination with an electronic circuit having an output of successive pulses of electric energy, means for operating a direct current device in response to said pulses which comprises: a saturable transistor having minority storage capabilities and collector, base and emitter electrodes; said minority storage capability of said transistor being so related to the frequency of succession of said pulses that it maintains the transistor in saturation between recurring pulses; a source of reference potential of a given polarity; a reference source of opposite polarity; means for connecting said collector, through said direct current device, to said reference source of given polarity; means for connecting said emitter to said reference of opposite polarity; a unidirectional conducting device having some resistance to current flow in its forward direction connected between said emitter and said base, means for causing forward current to flow through said unidirectional device thereby to bias said base with respect to said emitter as a result of said some resistance; and impedance means connecting said output to said base, said impedance means having a resistance adequate to cause said pulses to produce saturating current in said transistor.

5. An electronic circuit for operating a direct current device in response to successive pulses of electrical energy which comprises: a source of pulsed electric energy and a saturable transistor, having minority storage capabilities and collector, emitter and base electrodes, said minority storage capability of said transistor being so related to the frequency of succession of said pulses that it maintains the transistor in saturation between recurring pulses, said collector being connected through said device to be operated to a positive voltage source, said emitter being connected to a first negative voltage source, said base being connected through a first resistor to a junction point, a first unidirectional conductor connected between said first negative voltage source and said junction point and polarized for positive current flow in that direction, a second negative voltage source more negative than said first source connected through a second resistor to said junction point, and means including a second unidirectional conducting device connecting said pulse source to said junction point.

6. A system for operating a direct current operable device in response to a train of pulses comprising in combination, a transformer having primary and secondary windings, means for applying voltage impulses to the primary of said transformer, a transistor having base, collector and emitter electrodes, a unidirectional current conducting connection between one terminal of the secondary of said transformer and the base electrode of said transistor, the other terminal of said secondary being connected to a source of bias potential, means including a unidirectional conducting device connected between the emitter and base electrodes for providing bias for said transistor, means for causing saturation of said transistor upon application of a train of pulses from the secondary of said transformer whereby the minority storage characteristic of said transistor effectively generates a direct current signal at its collector, said direct current operable device being connected to said collector.

References Cited in the file of this patent

UNITED STATES PATENTS

| | | |
|---|---|---|
| 2,899,571 | Myers | Aug. 11, 1959 |
| 2,913,597 | Rowe | Nov. 17, 1959 |
| 2,985,769 | Blount | May 23, 1961 |
| 3,003,069 | Clapper | Oct. 3, 1961 |

FOREIGN PATENTS

| | | |
|---|---|---|
| 762,868 | Great Britain | Dec. 5, 1956 |

OTHER REFERENCES

Transistor Circuit Handbook, by Garner, published by Coyne Electrical School, Chicago, Aug. 1, 1956, pages 297–301.